(12) United States Patent
Men et al.

(10) Patent No.: US 11,025,594 B2
(45) Date of Patent: Jun. 1, 2021

(54) SECRET INFORMATION DISTRIBUTION METHOD AND DEVICE

(71) Applicant: HUAWEI TECHNOLOGIES CO., LTD., Guangdong (CN)

(72) Inventors: Fanglong Men, Xi'an (CN); Mihai Serb, Munich (DE); Fangzhan Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 16/456,065

(22) Filed: Jun. 28, 2019

(65) Prior Publication Data

US 2019/0319931 A1    Oct. 17, 2019

Related U.S. Application Data

(63) Continuation of application No. PCT/CN2016/113863, filed on Dec. 30, 2016.

(51) Int. Cl.
*H04L 29/06*     (2006.01)
*G06F 9/455*     (2018.01)
(Continued)

(52) U.S. Cl.
CPC .......... *H04L 63/04* (2013.01); *G06F 9/45533* (2013.01); *G06F 21/64* (2013.01);
(Continued)

(58) Field of Classification Search
CPC ..... H04L 63/04; H04L 67/10; H04L 41/0806; H04L 47/82; G06F 21/64; G06F 9/45533
(Continued)

(56) References Cited

U.S. PATENT DOCUMENTS

2011/0016510 A1   1/2011  Matsuda et al.
2015/0319160 A1*  11/2015 Ferguson ............ G06F 21/6281
                                                            726/10
(Continued)

FOREIGN PATENT DOCUMENTS

CN       101965709 A    2/2011
CN       102110197 A    6/2011
(Continued)

OTHER PUBLICATIONS

PCT International Search Report and Written Opinion issued in International Application No. PCT/CN2016/113863 on Jul. 27, 2017, 16 pages (with English translation).
(Continued)

*Primary Examiner* — Dant B Shaifer Harriman
(74) *Attorney, Agent, or Firm* — Fish & Richardson P.C.

(57) ABSTRACT

Embodiments of the present disclosure disclose a secret information distribution method. The method includes: receiving, by a network functions virtualization infrastructure NFVI, secret information sent by management and orchestration (MANO); creating a virtual trusted platform module (vTPM) in the NFVI, and writing the secret information into the vTPM; receiving, by the network functions virtualization infrastructure NFVI, a virtualized network function VNF initialization command from the MANO, and creating a VNF; and obtaining, by the VNF, the secret information from the vTPM.

7 Claims, 6 Drawing Sheets

(51) Int. Cl.
*G06F 21/64* (2013.01)
*H04L 12/24* (2006.01)
*H04L 12/911* (2013.01)
*H04L 29/08* (2006.01)

(52) U.S. Cl.
CPC .......... *H04L 41/0806* (2013.01); *H04L 47/82* (2013.01); *H04L 67/10* (2013.01)

(58) Field of Classification Search
USPC .......................................................... 726/26
See application file for complete search history.

(56) References Cited

U.S. PATENT DOCUMENTS

| | | | |
|---|---|---|---|
| 2016/0127333 A1 | 5/2016 | Sood et al. | |
| 2016/0134607 A1 | 5/2016 | Liu | |
| 2016/0321094 A1 | 11/2016 | Rabi et al. | |
| 2016/0328259 A1 | 11/2016 | Xia et al. | |
| 2016/0381150 A1* | 12/2016 | Rajagopal | H04L 41/28 709/223 |
| 2017/0005990 A1* | 1/2017 | Birger | G06F 3/0619 |
| 2017/0054710 A1 | 2/2017 | Xiong et al. | |

FOREIGN PATENT DOCUMENTS

| | | |
|---|---|---|
| CN | 105103507 A | 11/2015 |
| CN | 105284091 A | 1/2016 |
| CN | 105468435 A | 4/2016 |
| CN | 105577637 A | 5/2016 |
| WO | 2015169126 A1 | 11/2015 |
| WO | 2016045082 A1 | 3/2016 |
| WO | 2016070729 A1 | 5/2016 |

OTHER PUBLICATIONS

Huawei,"Key Pair Generation",NFV SEC (16)000XX6, NFV SEC #89, XP014283098, dated Dec. 1, 2016, 3 pages.

Extended European Search Report issued in European Application No. 16925261.6 dated Dec. 20, 2019, 6 pages.

Office Action issued in Chinese Application No. 201680091655.1 dated Feb. 3, 2020, 10 pages (with English translation).

Ming Jiang et al., "The evolution of NFV and VNF architecture and the future of network architecture," Systems and Solutions, dated Feb. 15, 2016, 9 pages (English abstract).

Office Action issued in Chinese Application No. 201680091655.1 dated Oct. 9, 2020, 7 pages (with English translation).

* cited by examiner

SECRET INFORMATION DISTRIBUTION METHOD AND DEVICE

CROSS-REFERENCE TO RELATED APPLICATIONS

This application is a continuation of International Application No. PCT/CN2016/113863, filed on Dec. 30, 2016, the disclosure of which is hereby incorporated by reference in its entirety.

TECHNICAL FIELD

The present invention relates to the communications field, and in particular, to a secret information distribution method and a device.

BACKGROUND

A conventional telecommunications system includes various dedicated hardware devices, and different hardware devices are used for different applications. The system becomes more complex as a network scale increases, thereby posing many challenges, including development and go-online of new services, system operation and maintenance, resource utilization, and the like. To meet these challenges and use a virtualization technology and a cloud computing technology in the IT industry, in the "SDN and OpenFlow World Congress" held on Oct. 22, 2012, 13 major telecommunications operators around the world jointly released an NFV white paper, and declared to establish the NFV ISG in the ETSI, to formulate an NFV requirement and technology framework and promote the development of NFV.

A network function virtualization (Network Function Virtualization, NFV) technology can be simply understood as a technology performing a function of each network element used in a telecommunications network by using a general-purpose commercial-off-the-shelf (COTS, Commercial-off-the-shelf) server instead of a current dedicated hardware platform. By using the NFV technology, each network element used in the telecommunications network is transformed into an independent application that can be flexibly deployed on a unified infrastructure platform that is constructed based on a standard server, storage, a switch, and other devices. An infrastructure hardware device is implemented as a resource pool and virtualized by using a virtualization technology, and a virtual resource is provided for an upper-layer application, to decouple an application and hardware. In this way, a virtual resource can be rapidly added for each application, to rapidly expand a system capacity, or a virtual resource can be rapidly reduced, to reduce a system capacity, thereby greatly improving network elasticity. A shared resource pool is created by using the general-purpose COTS server. When a new service is being developed, there is no need to independently deploy a hardware device, so that go-online time of the new service is greatly shortened.

A basis of the NFV technology includes the cloud computing technology and the virtualization technology. Hardware devices such as general-purpose COTS computing/storage/network devices can be decomposed into various virtual resources by using the virtualization technology, to be used by various upper-layer applications. The application and the hardware are decoupled by using the virtualization technology, so that a virtual resource provisioning speed is greatly improved. Elastic scaling of applications can be implemented by using the cloud computing technology, so that a virtual resource matches service load. This not only improves utilization efficiency of the virtual resource, but also improves a system response rate.

Specifically, when a virtualized network function VNF is installed in an NFV management and orchestration MANO system, some secret information needs to be pre-configured before the VNF is started, for example, an FTP password, a DB password or a password encryption key, an SSH public key, or a digital signature public key for a software package. Some information needs to be used at a startup stage. In an existing mode, a password, a key, and the like (such as the FTP password, the DB password, or the SSH public key) needed at an installation stage are mostly pre-configured in the software package. Such sensitive data is protected through encryption or permission control. If a root key is leaked, secret information is leaked. If a configuration disk manner such as a CD-ROM is used, data cannot be erased once being written. For an NFVI, data in a configuration disk can be directly viewed as plaintext.

SUMMARY

In view of this, embodiments of the present invention provide a secret information distribution method, to reduce a risk of leaking secret information.

An embodiment of the present invention provides a secret information distribution method. The method includes: receiving, by a network functions virtualization infrastructure NFVI, secret information sent by management and orchestration MANO; creating a vTPM in the NFVI, and writing the secret information into the vTPM; receiving, by the network functions virtualization infrastructure NFVI, a virtualized network function VNF initialization command from the management and orchestration MANO, and creating a VNF; and obtaining, by the VNF, the secret information from the vTPM.

An embodiment of the present invention further provides a secret information distribution system. The system includes management and orchestration MANO and a network functions virtualization infrastructure NFVI. The MANO is configured to send secret information to the NFVI. The NFVI is configured to: receive the secret information sent by the MANO, create a vTPM in the NFVI, and write the secret information into the vTPM. The NFVI is further configured to receive a virtualized network function VNF initialization command from the MANO and create a VNF. The VNF is configured to obtain the secret information from the vTPM.

An embodiment of the present invention further provides a network functions virtualization infrastructure NFVI. The NFVI may implement the functions performed by the NFVI in the method according to the foregoing aspect. The functions may be implemented by hardware or may be implemented by hardware executing corresponding software. The hardware or software includes one or more units or modules corresponding to the foregoing functions.

In a possible design, a structure of the NFVI includes a processor and a communications interface. The processor is configured to support the NFVI in performing the corresponding functions in the foregoing method. The communications interface is configured to support the NFVI in communicating with another network element. The NFVI may further include a memory. The memory is coupled to the processor and is configured to store a program instruction and data that are necessary to the NFVI.

According to another aspect, an embodiment of the present invention provides a computer storage medium, configured to store computer software instructions used by the foregoing NFVI. The computer software instructions contain a program designed for executing the foregoing aspects.

This application further provides a computer program product that includes an instruction. When the instruction runs on a computer, the computer is enabled to perform the method according to the foregoing aspects.

In the foregoing solutions, only the vTPM learns of the secret information of the VNF, and therefore the secret information does not go beyond a trusted environment. This ensures confidentiality and integrity of the secret information, and also prevents the secret information from being leaked in a distribution process.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the purpose, technical solutions, and advantages of the embodiments of the present invention clearer, the following describes the technical solutions of the embodiments of the present invention with reference to the accompanying drawings in the embodiments of the present invention.

Network architectures and service scenarios described in the embodiments of the present invention are intended to describe the technical solutions of the embodiments of the present invention more clearly, and do not constitute any limitation to the technical solutions provided in the embodiments of the present invention. A person of ordinary skill in the art may be aware that with the evolution of network architectures and emergence of new service scenarios, the technical solutions provided in the embodiments of the present invention are also applicable to similar technical problems.

A method in the embodiments of the present invention may be applied to an NFV-based network architecture, and may be further applied to a network architecture that is based on an application container engine (for example, Docker), a network architecture that is based on a virtual machine monitor (Virtual Machine Monitor, VMM), a network architecture that is based on OpenStack, or other network architectures that are based on a virtualization technology. The VMM may also be referred to as a hypervisor. The solutions of the embodiments of the present invention are described by using the NFV-based network architecture as an example.

Figure 1:
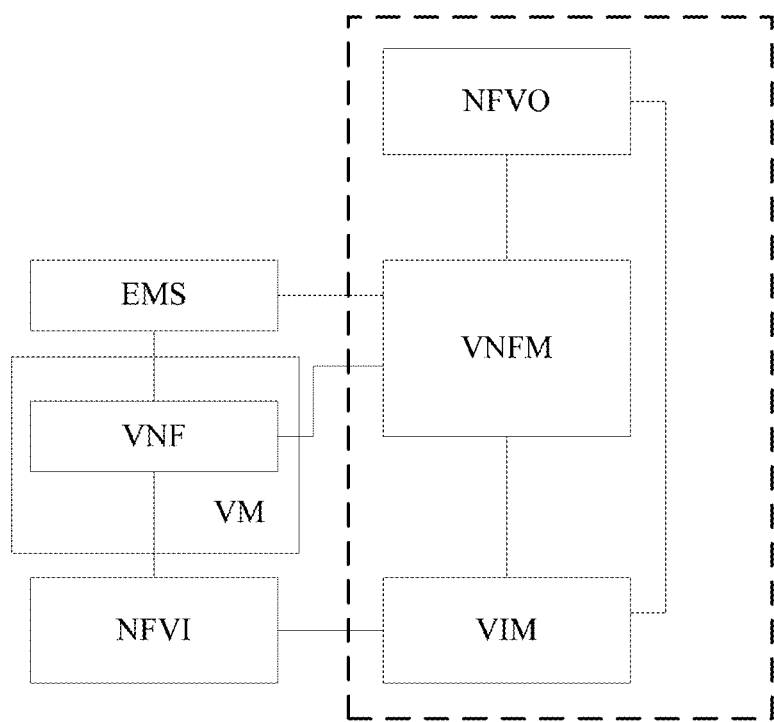
FIG. 1 is a schematic diagram of an NFV-based network architecture applicable to an embodiment of the present invention.

FIG. 1 is a schematic diagram of an NFV-based network architecture according to an embodiment of the present invention. As shown in FIG. 1, the network architecture includes a network functions virtualization orchestrator (Network Functions Virtualization Orchestrator, NFVO), a virtualized network function manager (Virtualized Network Functions Manager, VNFM), a virtualized infrastructure manager (Virtualized Infrastructure Manager, VIM), a network functions virtualization infrastructure (Network Function Virtualization Infrastructure, NFVI), a virtual machine (Virtual Machine, VM), a virtualized network function (Virtualized Network Function, VNF), and an element management system (Element Management System, EMS). The NFVO, the VNFM, and the VIM belong to management and orchestration (Management and Orchestration, MANO) of an NFV system. Related functions of the MANO may be implemented by hardware, and may also be implemented by software.

To facilitate understanding of the embodiments of the present invention, the following separately briefly describes the foregoing network elements and elements related to the present invention.

A virtualization container (virtualization container) is a part of a computing node, and is configured to provide an isolated virtualized computing environment. A typical example of a virtualization container is a VM. The VM is a virtual device obtained through simulation on a physical device by using virtual machine software. For an application program running on a VM, the VM operates like a real physical device. An operating system and application programs can be installed on the virtual machine, and the virtual machine may further access network resources.

The VNF, also referred to as a virtualized network element, corresponds to a physical network function in a conventional non-virtualized network. Functional behavior and a state that are of a network function are irrelevant to whether the network function is virtualized. The VNF may include a plurality of lower-level components. Optionally, one VNF may be deployed on a plurality of VMs, and each VM hosts (host) one virtualized network function component (Virtualized Network Function Component, VNFC). Optionally, one VNF may be alternatively deployed on one VM.

The VNFM is mainly configured to implement lifecycle management of a VNF instance, including initialization of the VNF instance, capacity expansion or capacity reduction of the VNF instance, and termination of the VNF instance.

The EMS is mainly configured to perform conventional FCAPS (fault management, configuration management, accounting management, performance management, and security management) functions on the VNF. The EMS may exist alone, or may be a VNF having an EMS function.

The VIM is mainly responsible for management, monitoring, and fault reporting of infrastructure-layer hardware resources and virtualized resources, and provides a virtualized resource pool for upper-layer applications.

The NFVI is mainly configured to provide hardware and virtual resources for operation of an entire system, and includes hardware resources (including three parts: computing, network, and storage), a virtualization layer (on which hardware resources are virtualized into a resource pool), and virtual resources (also divided into three parts: computing, network, and storage). From a perspective of the VNF, the virtualization layer and the hardware resources is an entity that can provide required virtual resources.

The NFVO is configured to: manage a network service descriptor (Network Service Descriptor, NSD), a virtualized network function descriptor (Virtualized Network Function Descriptor, VNFD), and a virtualized network function forwarding graph (Virtualized Network Function Forwarding Graph, VNFFG), manage a lifecycle of a network service (Network Service, NS), and implement a global resource view function.

The following describes the embodiments of the present invention in detail with reference to the accompanying drawings.

Figure 2:
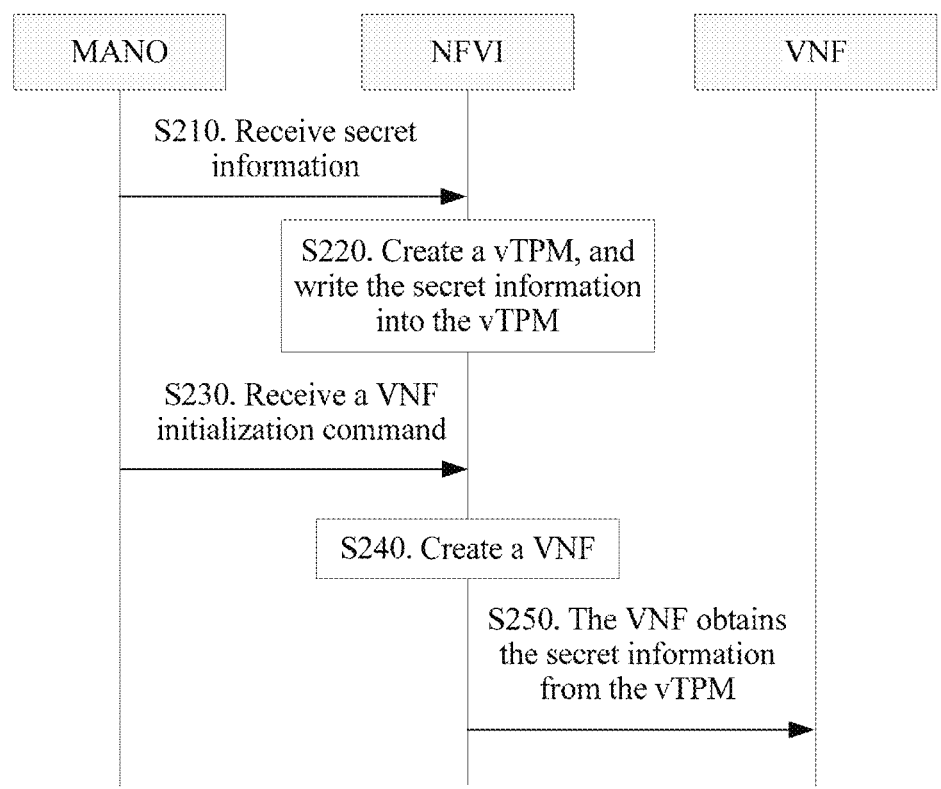
FIG. 2 is a flowchart of a secret information distribution method according to an embodiment of the present invention.

FIG. 2 is a flowchart of a secret information distribution method according to an embodiment of the present invention. As shown in FIG. 2, the method includes the following steps.

S210. A network functions virtualization infrastructure NFVI receives secret information sent by MANO.

The MANO allocates the secret information to a VNF at a pre-installation stage of the VNF. The secret information is used in subsequent creation of the VNF or is used to request to use a related service. The secret information includes sensitive information such as an access credential and a key. The access credential includes a user name/a password, a public key, or the like, and is used to connect to a server to obtain a service, for example, FTP/DB/SSH. A negotiation key includes a key for transferring encrypted data, a pre-shared key in a TLS PSK manner, a digital signature public key, a key for ensuring message integrity, or the like.

Information sent together with the secret information may further include identity information of the to-be-created VNF. The identity information of the VNF may be ID information or similar information of the VNF, and is used to uniquely identify the VNF. The identity information of the to-be-created VNF may be sent separately by the MANO or may be sent together with the secret information, provided that an association relationship between the secret information and the to-be-created VNF can be established. In other words, the secret information is only provided for and used by a VNF that is in a one-to-one binding relationship with the secret information. According to the following steps, after the to-be-created VNF is created, the VNF obtains the secret information and uses the secret information in subsequent other service requests.

S220. Create a virtual trusted platform module vTPM (Virtual Trusted Platform Module) in the NFVI, and write the secret information into the vTPM.

The vTPM is one of TPM virtualization solutions, and enables each virtual machine in a virtualized environment to obtain a complete trusted computing function. When the virtual trusted platform module is used, secure storage and encryption functions of a TPM can be used in the VNF, to support trust creation in the virtualized environment, especially remote verification of software integrity. A vTPM instance is a TPM in a VNF. Each VNF that requires a TPM function is only associated, namely in a one-to-one correspondence, with a unique vTPM instance in an entire lifecycle of the VNF.

A vTPM O&M agent located in the NFVI creates the corresponding vTPM, and writes the secret information into the vTPM during allocation of a vTPM AIK/EK. The TPM/vTPM is defined by a TCG (Trusted Computing Group). Refer to related prior art or existing protocols.

S230. The network functions virtualization infrastructure NFVI receives a virtualized network function VNF initialization command from the management and orchestration MANO, and creates a VNF.

After the secret information is written into the vTPM, the MANO sends an initialization command for creating the VNF to the NFVI. The command includes the identity information of the to-be-created VNF in S210, so that identity information of the created VNF is consistent with the identity information in S210.

S240. The VNF obtains the secret information from the vTPM.

The VNF sends a request message to the vTPM corresponding to the VNF, and the vTPM sends the secret information to the VNF.

In the foregoing embodiment, only the vTPM learns of the secret information of the VNF, and therefore the secret information does not go beyond a trusted environment. This ensures confidentiality and integrity of the secret information, and also prevents the secret information from being leaked in a distribution process.

In this embodiment of the present invention, the MANO may be any one of an NFVO, a VNFM, and a VIM. Optionally, the VNF initialization command may be sent to the NFVI by using the VIM, and the NFVI creates the VNF after receiving the VNF initialization command.

How the NFVI creates the VNF based on the VNF initialization command is a well-known technology in the art. Details are not described herein.

The following further describes the embodiments of the present invention in detail based on common aspects related to the present invention described above.

Figure 3:
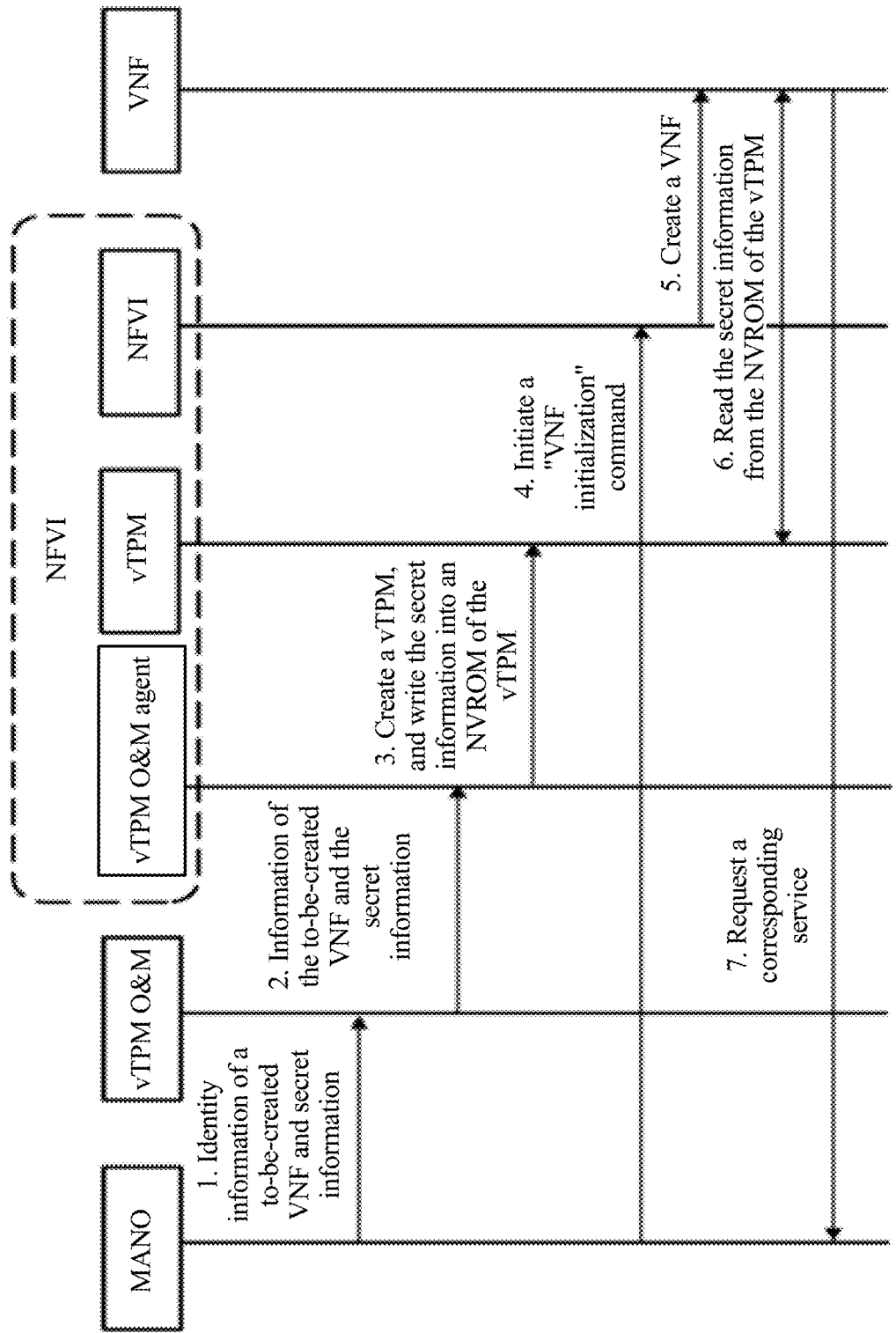
FIG. 3 is a detailed flowchart of secret information distribution according to an embodiment of the present invention.

FIG. 3 is a detailed flowchart of secret information distribution according to an embodiment of the present invention. Secret information in this embodiment is allocated by MANO, and is sent by vTPM O&M in the MANO to a vTPM O&M agent in an NFVI. Specific steps are as follows:

1. The MANO transfers secret information allocated to a VNF and identity information of the to-be-created VNF to the vTPM O&M at a pre-installation stage of the VNF, where the vTPM O&M is located in the MANO, for example, may be located in a VIM of the MANO.

2. The vTPM O&M forwards the secret information to the vTPM O&M agent in the NFVI.

3. The vTPM O&M agent creates a vTPM for the to-be-created VNF, and writes the secret information into an NVROM (read only) of the vTPM during allocation of a vTPM AIK/EK.

4. The MANO initiates a "VNF initialization" command, namely, a VNF creation command, to the NFVI.

5. The NFVI instantiates the VNF, in other words, creates the VNF, where identity information of the VNF is consistent with the identity information of the VNF in step 1.

6. A process in the VNF reads the secret information from the NVROM of the vTPM.

7. The VNF requests a service, such as FTP, SSH, or DB, from the MANO by using the secret information.

Figure 4:
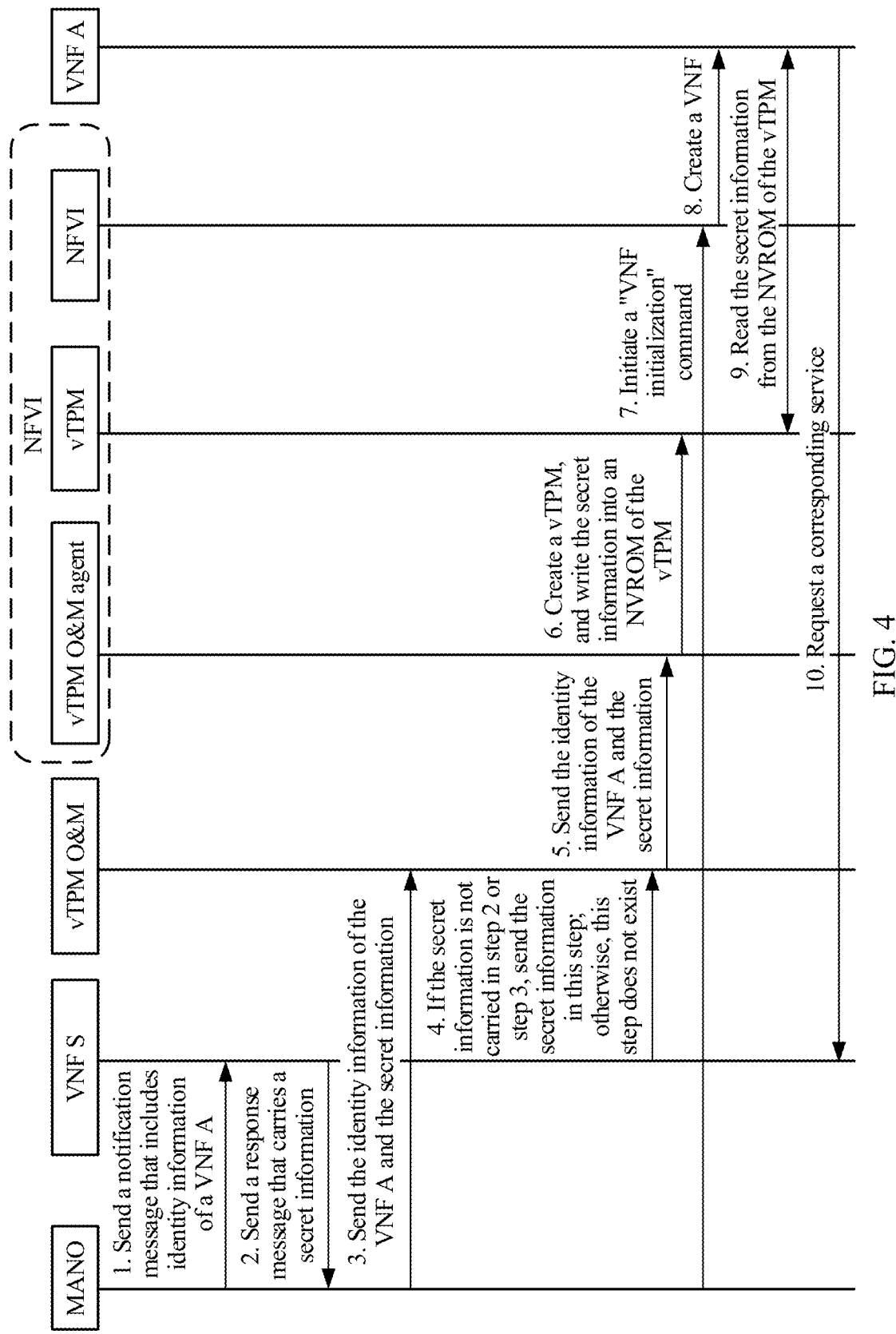
FIG. 4 is another detailed flowchart of secret information distribution according to an embodiment of the present invention.

FIG. 4 is another detailed flowchart of secret information distribution according to an embodiment of the present invention. Secret information in this embodiment is obtained by MANO from another VNF (a VNF A), and is sent by vTPM O&M in the MANO to a vTPM O&M agent in an NFVI. Specific steps are as follows:

1. The MANO initiates a notification message to a VNF S at a pre-creation stage of the VNF A, where the notification message includes identity information of the VNF A.

The VNF S is a virtual server and may be used to provide a related service for the VNF A, where the letters S and A herein are used to differentiate between different VNFs.

2. If the VNF S needs to pre-configure secret information for the VNF A, the VNF S inserts the secret information into response information of the MANO.

3. The MANO transfers the secret information that needs to be allocated and the identity information of the VNF A to the vTPM O&M. Then, skip to step 5.

4. If the secret information is not transferred in step 2 and step 3, the VNF S needs to directly send the secret information to the vTPM O&M. If the secret information is transferred in step 2 and step 3, this step does not exist.

5. The vTPM O&M forwards the identity information and the secret information to the vTPM O&M agent.

6. The vTPM O&M agent creates a vTPM for the to-be-created VNF, and writes the secret information into an NVROM (read only) of the vTPM during allocation of a vTPM AIK/EK.

7. The MANO initiates a "VNF A initialization" command to the NFVI.

8. The NFVI instantiates the VNF A, in other words, creates the VNF A, where identity information of the VNF is consistent with the identity information of the VNF A in step 1.

9. The VNF A reads the secret information from the NVROM of the vTPM.

10. The VNF A requests a service, such as FTP, SSH, or DB, from the VNF S by using the secret information.

In the foregoing embodiments, the identity information of the to-be-created VNF or the identity information of the VNF A may be carried in the secret information for transmission, or may be sent separately independent of the secret information. This embodiment sets no limitation thereto.

In the foregoing embodiments, the vTPM O&M is a centralized or distributed vTPM management module, and is configured to create or delete the vTPM, or the like. The vTPM O&M may be located at locations such as a VIM, a VNFM, or an NFVO. The vTPM O&M agent (agent process) is a distributed or centralized vTPM O&M agent process, and is configured to create or delete the vTPM and allocate information such as a vTPM AIK/EK. The vTPM O&M agent is located in the NFVI, and may be understood as a TPM agent process at a layer I.

In the foregoing embodiments, only the vTPM learns of the secret information of the VNF, and therefore the secret information does not go beyond a trusted environment. This ensures confidentiality and integrity of the secret information, and also prevents the secret information from being leaked in a distribution process.

The foregoing embodiments mainly describe the solutions of the embodiments of the present invention from a perspective of interaction between network elements. It may be understood that, to implement the foregoing functions, the network elements, such as the NFVI and the VNF, include corresponding hardware structures and/or software modules for performing the functions. A person of ordinary skill in the art should easily be aware that, in combination with units and algorithm steps of the examples described in the embodiments disclosed in this specification, the present invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of this application, function modules of the NFVI and the VNF may be divided based on the foregoing method example. For example, each function module may be divided according to each function, or two or more functions may be integrated into one processing module. The integrated unit may be implemented in a form of hardware, or may be implemented in a form of a software function unit. It should be noted that, in the embodiments of the present invention, unit division is an example, and is merely a logical function division. In actual implementation, another division manner may be used.

Figure 5A:
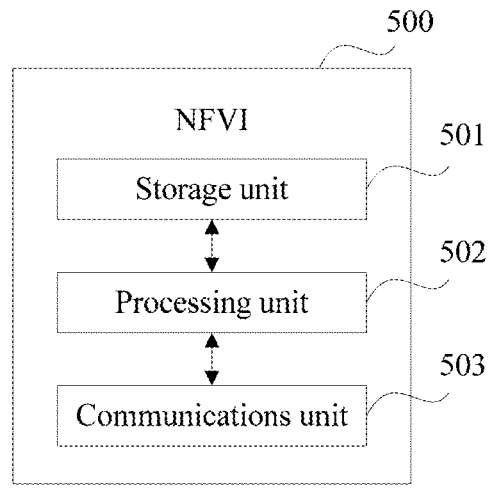
FIG. 5A is a possible schematic structural diagram of an NFVI according to an embodiment of the present invention.

When an integrated unit is used, FIG. 5A is a possible schematic structural diagram of an NFVI in the foregoing embodiments. An NFVI 500 includes a processing unit 502 and a communications unit 503.

The processing unit 502 is configured to control and manage actions of the NFVI 500. For example, the processing unit 502 is configured to support the NFVI 500 in performing the actions or steps of the NFVI in any one of the embodiments shown in FIG. 2 to FIG. 4, and/or is configured to perform another process of the technology described in this specification. The communications unit 503 is configured to support the NFVI 500 in communicating with other network elements, for example, communicating with the MANO shown in FIG. 3. The NFVI 500 may further include a storage unit 801, configured to store program code and data of the NFVI 500.

The communications unit 503 is configured to receive secret information from MANO.

The processing unit 502 is configured to create a virtual trusted platform module vTPM and write the secret information into the vTPM.

The communication unit 503 is further configured to receive a virtualized network function VNF initialization command from the management and orchestration MANO.

The processing unit 502 is further configured to create a VNF.

The communications unit 503 is further configured to send the secret information to the created VNF.

The processing unit 502 in the NFVI 500 may be a processor or a controller, such as a central processing unit (Central Processing Unit, CPU), a general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logical device, a transistor logical device, or a hardware component, or a combination thereof.

The processing unit may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor. The communications unit 503 may be a communications interface, a transceiver, a transceiver circuit, or the like. The communications interface is a general term, and may include one or more interfaces. The communications interface may further be an interaction interface between software or programs. The storage unit 501 may be a memory.

Figure 5B:
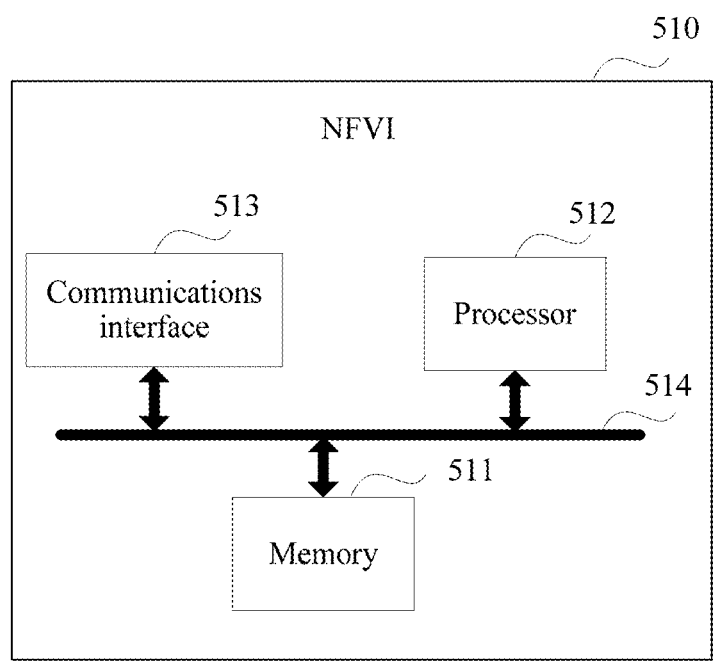
FIG. 5B is another possible schematic structural diagram of an NFVI according to an embodiment of the present invention.

When the processing unit 502 is a processor, the communications unit 503 is a communications interface, and the storage unit 501 is a memory, the NFVI in the embodiments of the present invention may be an NFVI shown in FIG. 5B.

As shown in FIG. 5B, an NFVI 510 includes a processor 512, a communications interface 513, and a memory 511. Optionally, the NFVI 510 may further include a bus 514. The communications interface 513, the processor 512, and the memory 511 are interconnected by using the bus 514. The bus 514 may be a Peripheral Component Interconnect (Peripheral Component Interconnect, PCI) bus, an Extended Industry Standard Architecture (Extended Industry Standard Architecture, EISA) bus, or the like. The bus 514 may be classified into an address bus, a data bus, a control bus, and the like. For ease of representation, only one thick line is used to represent the bus in FIG. 5B, but this does not mean that there is only one bus or only one type of bus.

Figure 6:
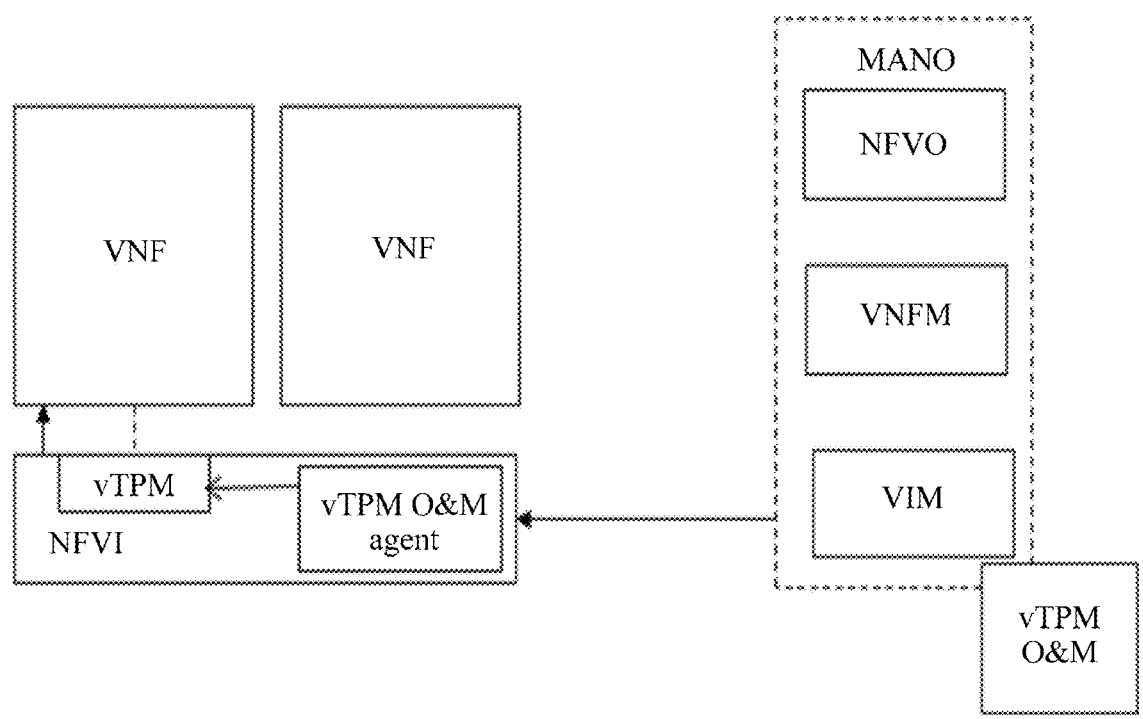
FIG. 6 is a schematic diagram of an NFV system for secret information distribution according to an embodiment of the present invention.

An embodiment of the present invention further provides a secret information distribution system. Specifically, referring to FIG. 6, the system includes management and orchestration MANO and a network functions virtualization infrastructure NFVI.

The MANO is configured to send secret information to the NFVI.

The NFVI is configured to receive the secret information sent by the MANO, create a vTPM in the NFVI, and write the secret information into the vTPM.

The NFVI is further configured to receive a virtualized network function VNF initialization command from the MANO and create a VNF.

The VNF is configured to obtain the secret information from the vTPM.

It may be clearly understood by a person skilled in the art that, for the purpose of convenient and brief description, for a detailed working process of the foregoing apparatus, unit, and system, refer to a corresponding process of the NFVI in the foregoing embodiments described in FIG. 2 to FIG. 4. Details are not described herein again.

Methods or algorithm steps described in combination with the content disclosed in this embodiment of the present invention may be implemented by hardware, or may be implemented by a processor by executing a software instruction. The software instruction may include a corresponding software module. The software module may be stored in a random access memory (Random Access Memory, RAM for short), a flash memory, a read-only memory (Read Only Memory, ROM), an erasable programmable read only memory (Erasable Programmable ROM, EPROM), an electrically erasable programmable read only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be located in the ASIC. In addition, the ASIC may be located in an NFVI instance and a VNF instance. Certainly, the processor and the storage medium may also exist the NFVI instance and the VNF instance as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific implementations of the present invention, but are not intended to limit the protection scope of the present invention. Any modification, equivalent replacement, or improvement made on the basis of the technical solutions of the present invention shall fall within the protection scope of the present invention.

What is claimed is:

1. A secret information distribution method, wherein the method comprises:
    receiving, by a network functions virtualization infrastructure (NFVI), secret information sent by management and orchestration (MANO);
    creating a virtual trusted platform module (vTPM) in the NFVI, and writing the secret information into the vTPM, wherein the secret information is allocated by the MANO or is obtained by the MANO from another VNF, and wherein the secret information is sent by vTPM operation and management (O&M) in the MANO to a vTPM O&M agent in the NFVI;
    receiving, by the NFVI, a virtualized network function (VNF) initialization command from the MANO, and creating a VNF; and
    obtaining, by the VNF, the secret information from the vTPM.

2. The method according to claim 1, wherein the MANO initiates a notification message to the another VNF, wherein the notification message comprises identity information of the VNF; and
    the another VNF inserts the secret information into response information sent to the MANO.

3. The method according to claim 1, wherein creating the vTPM, and writing the secret information into the vTPM comprises:
    creating, by the vTPM O&M agent, the vTPM, and writing the secret information into the vTPM during allocation of a vTPM Attestation Identity Key/Endorsement Key (AIK/EK).

4. A secret information distribution system, wherein the system comprises management and orchestration (MANO) and a network functions virtualization infrastructure (NFVI), wherein the MANO comprises virtual trusted platform module (vTPM) operation and management (O&M) and the NFVI comprises a vTPM O&M agent, and wherein:
    the MANO is configured to send secret information to the NFVI;
    the NFVI is configured to: receive the secret information sent by the MANO, create a virtual trusted platform module (vTPM) in the NFVI, and write the secret information into the vTPM, wherein the secret information is allocated by the MANO or is obtained by the MANO from another VNF, and wherein the secret information is sent by the vTPM O&M to the vTPM O&M agent;

the NFVI is further configured to receive a virtualized network function (VNF) initialization command from the MANO and create a VNF; and the VNF is configured to obtain the secret information from the vTPM.

5. The system according to claim 4, wherein creating the vTPM, and writing the secret information into the vTPM comprises:

creating, by the vTPM O&M agent, the vTPM, and writing the secret information into the vTPM during allocation of a vTPM AIK/EK.

6. A network functions virtualization infrastructure (NFVI), comprising:

one or more processors; and a non-transitory computer-readable memory storing a program to be executed by the one or more processors to cause the NFVI to:

receive secret information from management and orchestration (MANO);

create a virtual trusted platform module (vTPM) and write the secret information into the vTPM, wherein the secret information is allocated by the MANO or is obtained by the MANO from another VNF, and wherein the secret information is sent by vTPM operation and management (O&M) in the MANO to a vTPM O&M agent in the NFVI;

receive a virtualized network function (VNF) initialization command from the MANO;

create a VNF; and send the secret information to the VNF.

7. A non-transitory computer readable storage medium, comprising instructions, wherein when the instructions run on a computer, the computer is enabled to perform operations comprising:

receiving, by a network functions virtualization infrastructure (NFVI), secret information sent by management and orchestration (MANO);

creating a virtual trusted platform module (vTPM) in the NFVI, and writing the secret information into the vTPM, wherein the secret information is allocated by the MANO or is obtained by the MANO from another VNF, and wherein the secret information is sent by vTPM operations and management (O&M) in the MANO to a vTPM O&M agent in the NFVI;

receiving, by the NFVI, a virtualized network function (VNF) initialization command from the MANO, and creating a VNF; and obtaining, by the VNF, the secret information from the vTPM.

* * * * *